(No Model.) 2 Sheets—Sheet 2.
W. B. ALLEN.
DOMESTIC STEAMER.
No. 272,015. Patented Feb. 13, 1883.
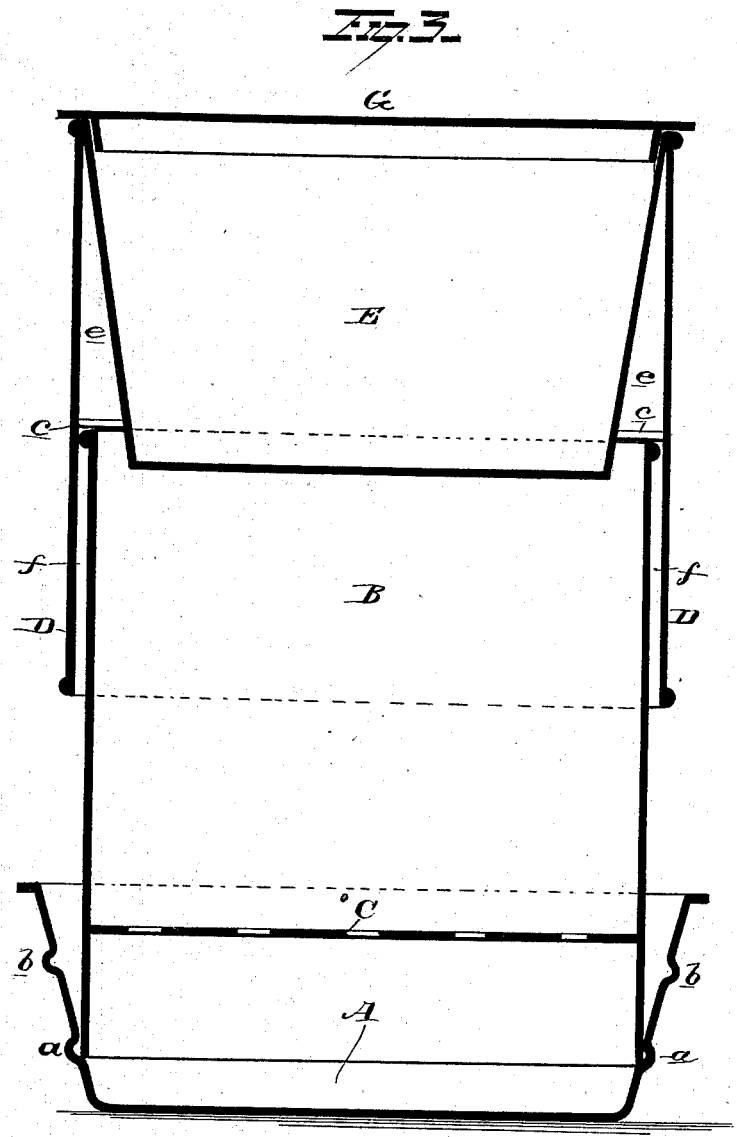

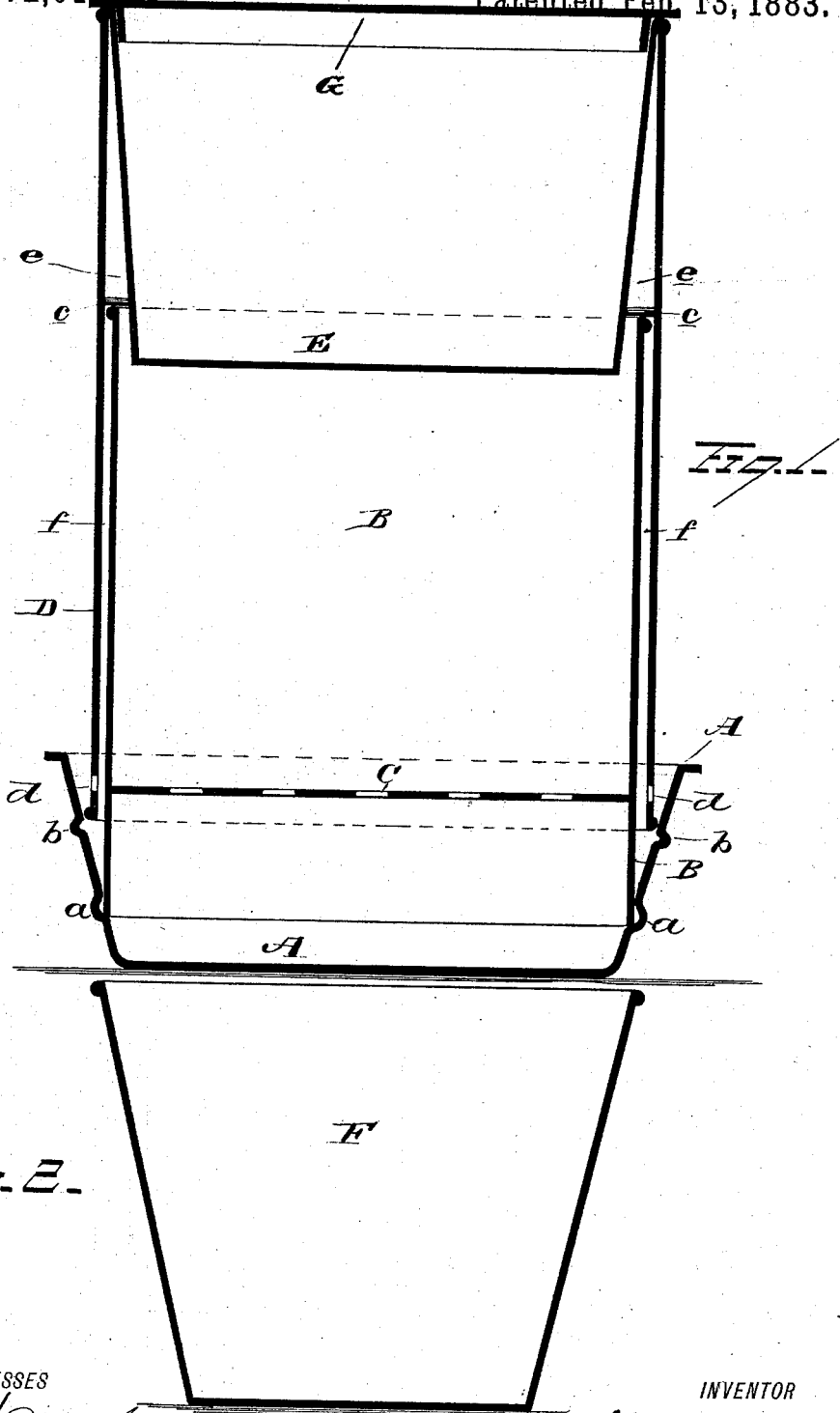

UNITED STATES PATENT OFFICE.

WILLIAM B. ALLEN, OF ORLEANS, NEW YORK.

DOMESTIC STEAMER.

SPECIFICATION forming part of Letters Patent No. 272,015, dated February 13, 1883.

Application filed June 6, 1882. (No model.)

*To all whom it may concern:*

Be it known that I, W. B. ALLEN, of Orleans, in the county of Ontario and State of New York, have invented certain new and useful Improvements in Domestic Steamers; and I do hereby declare the following to be a full, clear, and exact description of the invention, such as will enable others skilled in the art to which it pertains to make and use the same.

My invention relates to an improvement in domestic steamers, the object of the same being to provide an economical device of this character which shall combine simplicity and economy of construction with durability and efficiency in use; and with these ends in view my invention consists in certain details in construction and combination of parts, as will be more fully described, and pointed out in the claims.

In the accompanying drawings, Figure 1 represents a longitudinal vertical sectional view of my improvement. Fig. 2 is a view of an attachment, and Fig. 3 is a view showing a modification of my improvement.

A represents the heater or basin, of any suitable size and material, provided with the annular rib $a$, on which the steamer B rests, and with the annular groove $b$, which serves as a water-mark for the basin. This basin A is constructed, like an ordinary basin, with flaring or tapering sides and is adapted to rest directly on the stove.

The steamer B is an open steamer, made of any suitable material, open at the top and bottom and provided at any suitable point between its ends with a perforated diaphragm, C, for the passage of steam through the interior thereof. One important feature of my improvement is the manner of connecting this steamer to the heater, so as to form a steam-joint to prevent the escape of the steam between the lower end of the steamer and the heater. As before stated, the heater is provided with an inclined side and an annular groove, $a$, on which the steamer rests. When the steamer B has been placed on the heater as far down thereon as the tops of the sides thereof will admit without pressure, slight pressure is then used to force it down on the walls of the groove, which causes the side of the heater to spring outward and the lower end of the steamer to spring inward, which forms a strong, compact, and tight joint, which is sufficient to prevent the escape of steam when water is placed in the heater.

The condenser D is shaped externally like the steamer and is slightly larger in diameter than the same. A pan, E, located in the top of the said condenser, is secured in position by the attachment of its upper edges to the upper edges thereof, being strengthened in this adjustment by the bridges $c$, which unite the sides of the pan and the inner faces of the walls of the condenser. These bridges have another function in that by engaging with the upper edges of the steamer they support the condenser in position thereon. In virtue of this adjustment the pan E will extend into the steamer and be exposed to the action of the steam before its condensation. The steam escapes between the sides of the pan and the upper edges of the steamer into an annular chamber, $e$, from which it is deflected into a similar chamber, $f$, formed between the inner walls of the condenser and the outer walls of the steamer. If desired, the upper end of the condenser may be closed by a lid or cover, as seen at G. The condenser D extends downward on the outside of the steamer, its lower edge being located below the upper edge of the heater, so as to conduct the condensed steam into it. This condenser is provided near its lower edge with perforations $d$ for the admission of air to aid in condensing the steam after the latter has passed through the steamer. Instead of extending the condenser down below the edge of the heater, it can terminate above the same in such a position that the condensed steam will fall into the heater. When this latter construction is employed the perforations $d$ can be dispensed with.

To use my improved device water is first introduced into the heater up to or near the groove $b$, the steamer B is secured in position in the manner before described, and then the condenser D is placed on the steamer, as shown in the drawings. After the water begins to boil the steam formed within the steamer passes up through the perforated diaphragm thereof through the food being cooked and heats the vessel E, which latter is exposed throughout its entire length to the action of the heat. The steam as it passes upward enters the annular space between the vessel E and the condenser D, and then passes over the top edge of the steamer, and from thence downward between the inner surface of the condenser and the outer surface of the steamer, where it is condensed and falls into the basin on the outside of the steamer.

When it is desired to steam or cook articles of food that require a tight vessel, with or without the condenser, the tapering vessel F (shown in Fig. 2) can be placed directly in the upper end of the steamer B and answer all the necessary purposes. The upper rim or edge of this vessel is of the right size to rest on the upper edge of the steamer when placed thereon. An ordinary cover or lid can be placed over this vessel F; or the condenser before described can be placed in position and answer all the necessary purposes. The joint before described between the heater and steamer prevents steam from escaping from the interior of the steamer if the water should fall below the said joint, which is an important feature in this style of cookers.

It is evident that slight changes in the construction and the arrangement of the different parts of my improvement might be resorted to without departing from the spirit of my invention; and hence I would have it understood that I do not limit myself to the exact construction shown and described, but consider myself at liberty to make such changes as come within the spirit and scope of my invention.

Having fully described my invention, what I claim as new, and desire to secure by Letters Patent, is—

1. In a domestic steamer, the combination, with a heater having flaring sides, the same being encircled by an annular groove, of a cylindrical steamer adapted to be introduced into the heater, with which it forms a tight joint, by the engagement of its lower end with the upper and lower walls of the groove encircling it, substantially as set forth.

2. In a domestic steamer, the combination, with a heater, of a removable cylindrical steamer provided with a perforated diaphragm, a cylindrical condenser larger than the steamer, but of lesser diameter than the top of the heater, and a pan permanently secured in the top of the condenser, and arranged to extend into the top of the steamer and to deflect the steam over the upper edge thereof and into the condenser, substantially as set forth.

3. In a domestic steamer, the combination, with a heater, of a cylindrical steamer and a cylindrical condenser larger than the steamer, but of lesser diameter than the top of the heater into which it fits, the lower edge of said condenser being perforated.

4. In a domestic steamer, the combination, with a heater, of a cylindrical steamer, a pan permanently secured in the top of the condenser by its upper edge, and bridges uniting the sides of the pan and the walls of the condenser, said bridges bearing upon the upper edges of the steamer and supporting the condenser in position, substantially as set forth.

In testimony whereof I have signed this specification in the presence of two subscribing witnesses.

WILLIAM B. ALLEN.

Witnesses:
EDWIN WARNER,
JACOB A. WADER.